United States Patent [19]

Hosaka et al.

[11] Patent Number: 4,956,807
[45] Date of Patent: Sep. 11, 1990

[54] WATCHDOG TIMER

[75] Inventors: Akio Hosaka, Kanagawa; Akito Yamamoto, Yokohama, both of Japan

[73] Assignee: Nissan Motor Company, Limited, Yokohama, Japan

[21] Appl. No.: 562,011

[22] Filed: Dec. 16, 1983

[30] Foreign Application Priority Data

Dec. 21, 1982 [JP] Japan ............................... 57-222846

[51] Int. Cl.⁵ .................................................. G06F 1/24
[52] U.S. Cl. ......................................... 364/900; 371/62
[58] Field of Search ....................... 371/12, 60, 62, 67, 371/70, 18; 364/200 MS File, 900 MS File

[56] References Cited

U.S. PATENT DOCUMENTS

| 3,919,533 | 11/1975 | Einolf, Jr. et al. | 371/62 |
| 3,934,131 | 1/1975 | Perschy | 371/62 X |
| 4,072,852 | 2/1978 | Hogan et al. | 364/900 |
| 4,392,226 | 7/1983 | Cook | 371/62 X |
| 4,405,982 | 9/1983 | Ruhnham et al. | 364/200 |
| 4,422,067 | 12/1983 | Clark et al. | 340/508 |
| 4,538,273 | 8/1985 | Lasser | 371/62 |
| 4,541,050 | 9/1985 | Honda et al. | 371/62 X |
| 4,558,428 | 12/1985 | Matsumura et al. | 364/900 |

FOREIGN PATENT DOCUMENTS 56-92655 7/1981 Japan ..................................... 371/60

OTHER PUBLICATIONS

Carnes, M. L., Correy, R. M.; "Processor Checking," IBM Technical Disclosure Bulletin, vol. 17, No. 11, Apr. 1975, pp. 3188-3189.

Primary Examiner—David L. Clark
Attorney, Agent, or Firm—Foley & Lardner, Schwartz, Jeffery, Schwaab, Mack, Blumenthal & Evans

[57] ABSTRACT

A watchdog timer works in concert with special computer program features to monitor program execution and reset the computer in case of malfunction. The computer CPU is programmed to periodically output one of an alternating pair of values to a register which holds the value for a comparator. The output value is compared to a predetermined value equal to one of the alternating output value. When the compared values are equal, the comparator outputs a reset signal to a counter. The counter counts clock pulses and if it counts to its full capacity before being reset by the comparator output, it outputs a reset signal which causes the computer to restart program execution. A second comparator may be provided to compare the alternating values to a reference value equal to the other values. Thus the comparators check for proper output of both signals and reset the counter only in response to receipt of both values. In addition a second counting system may be provided so that the computer will be reset whether the period of alternating value output increases or decreases.

8 Claims, 3 Drawing Sheets

WATCHDOG TIMER

BACKGROUND OF THE INVENTION

The present invention relates to a supervisory apparatus for a computer and more particular to a watchdog timer which monitors execution of a program by the computer to return the computer to its initial state when the program malfunctions.

One conventional watchdog timer disclosed in a Japanese unexamined patent publication TOKKAISHO 55-57956 senses whether or not a series of consecutive pulses are produced at the output terminal of a microcomputer in accordance with a program in order to determine whether or not the program is running normally. When the program runs abnormally or erroneously due to noise, the watchdog timer resets the microcomputer to return it to its initial state, thereby causing reexecution of the program from the beginning. The microcomputer employs a circuit structure in which "1" and "0" are written alternately into a predetermined 1-bit cell of a register of its output circuit, thereby changing the device output terminal alternately to "1" and "0."However, there is a some possibility that the 1-bit register output will not be sensed accurately due to noise. The microcomputer reads commands stored in addresses in memory (generally ROM) corresponding to the contents of a program counter, decodes the commands and processes data also stored in the memory. When the computer is working regularly under the control of a program, it correctly performs tasks sequentially. However, when the program counter malfunctions due to noise or the like, the microcomputer may read, not commands, but data from the memory, decode the data as if the data were commands and perform the corresponding, erroneous operations. When the results of the commands executed by the data are output by the 1-bit register cell, the watchdog timer will not be able to recognize abnormal execution of the program. Since commands and data stored in the memory are both formulated by combinations of 1's and 0's having the same number of bits, but with values that vary widely, if the program counter fails as above, the microcomputer is very likely to malfunction as described above. Other publications which handle this subject matter in a manner similar to that of TOKKAISHO 55-57956 are Tokkaisho 57-48143, 50004 and 55432.

SUMMARY OF THE INVENTION

It is therefore an object of the present invention to provide a watchdog timer which uses as an output a combination of a plurality of bits in order to greatly enhance the reliability to detect abnormal execution of a program.

According to the present invention, a computer produces a signal including two different periodically alternating data each including a plurality or bits in accordance with a program stored in the computer. A register stores the two different data alternately. A comparator means has a preset reference data equal to one of the two different data and compares the reference data to the data stored in the register to produce an output signal when the compared two data coincide. A counter counts clock pulses and outputs a reset signal to the computer when the count reaches a predetermined value. The counter is reset by the output signal from the comparator. The time interval required for the counter to count to the predetermined value is selected to be longer than the normal interval between output signals from the comparator, whereby normally the counter does not produce the reset signal to the computer. However, if the computer control program runs wild, the comparator does not produce an output signal periodically. Thus, the time interval between two consecutive output signals from the comparator can be longer than the time required for the counter to count to the predetermined value, in which case, the counter outputs the reset signal to the computer to reset same.

DETAILED DESCRIPTION OF THE DRAWINGS

Figure 1:
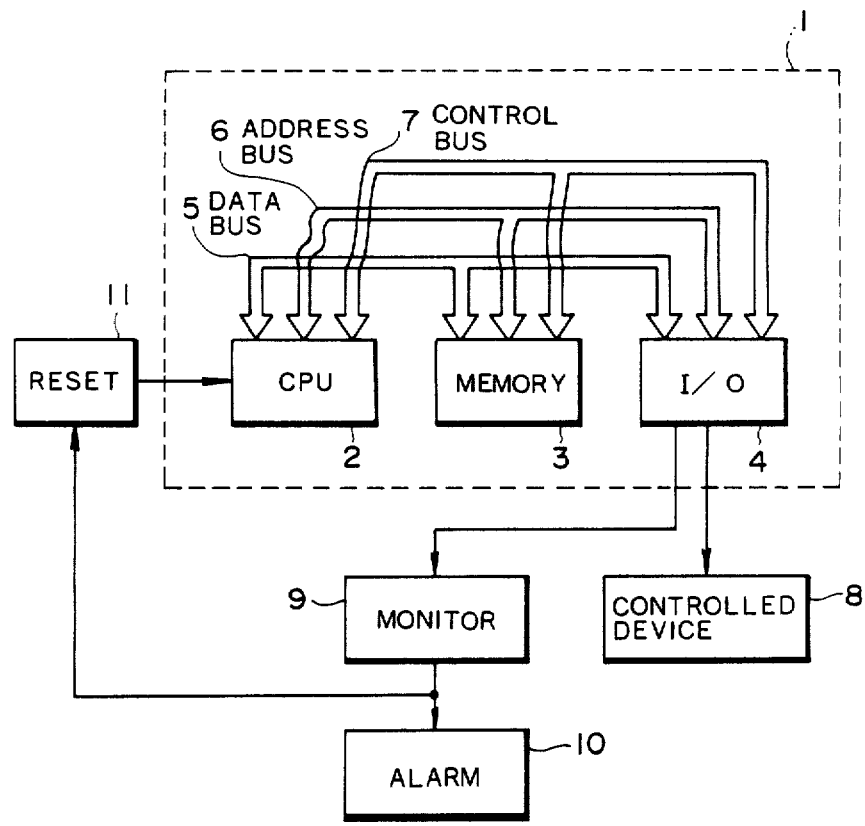
FIG. 1 illustrates application of a prior art watchdog timer.

First, the prior art described in the introduction of the present invention will be described in more detail with reference to FIG. 1. A microcomputer 1, which includes a CPU 2, a memory 3 and an input/output interface 4 interconnected in a well-known manner by a data bus 5, an address bus 6 and a control bus 7, controls a controlled device 8. This control is well known. The output of a 1-bit register cell in I/O interface 4 alternates between 1 and 0. The output of the cell is checked by a monitor 9. When monitor 9 detects that the output is abnormal, it produces an alarm as well as resets CPU 2 via reset circuitry 11. This watchdog timer has the drawback mentioned above.

A preferred embodiment of a watchdog timer according to the present invention will be described with respect to FIG. 2. As in FIG. 1, a CPU 20, a ROM 30, a RAM 40 and an I/0 unit 50 are interconnected also in a well-known manner by a bus 90. The watchdog timer, designated by reference numeral 100, includes a register 60 connected to bus 90, a comparator 70 connected to the output terminal of register 60 which is assigned a predetermined address, and a counter 80 connected to the output terminal of comparator 70. CPU 20 reads data corresponding to input signals 51, 52, 53 . . . from I/O 50 in accordance with the commands stored in ROM 30 and performs arithmetic operations on the read data and produces outputs 56, 57, 58 . . . via I/O 50. The data and their temporary derivatives are temporarily stored in RAM 40.

When the program is running normally, two different predetermined data, each consisting of a plurality of bits, are written into register 60 alternately at predetermined intervals of time T. One of the two predetermined different data is the same as reference data which is previously stored in comparator 70 and which may be assumed to be AA (10101010) in 8-bit, hexadecimal notation. Comparator 70, which may include two series connected 4-bit digital comparators, (CD 4063 comparator sold by RCA) compares the 8-bit reference data to the output data 61 of register 60 which is written by the CPU. If the reference data equals the register output, the comparator output is 1, and otherwise 0. Thus, the comparator output switches between coincidence and uncoincidence at the predetermined intervals of time T and is inputted to a clear input terminal of counter 80. Counter 80 may be composed of a multi-stage flip-flop and counts clock pulses supplied via bus 90. When a predetermined interval of time T' ($=t_c \times 2^n$) where $t_c$ is the period of clock pulses 91 and n is the number of stages of flip-flops, has elapsed, a carry 81 is outputted which resets CPU 20.

Now assume that 2T is less than T'. Normally, counter 80 will be cleared by the rising edge, for example, of the comparator output 71 before the reset time T' has elapsed, so that no carry output or reset signal will be produced and CPU 20 will continue to execute its program. When the program runs abnormally, so that data are no longer written into register 60 or the output of register 60 coincides at all times with the reference data even if data are written into the register, the output of comparator output 71 becomes fixed to either 1 or 0. Thus, no rising edge signal is produced, so that CPU 20 is reset after time T' after the last rising edge. Then the program begins to execute again from the initialized state, so that the computer operation returns to its normal state from the malfunction due to a single occurrence of noise. When the abnormal state continues due to system malfunction, reset operations are repeated until the computer operation returns to its normal state, thereby preventing occurrence of abnormal output. Although not shown, a reset signal should be outputted to I/O 50 if the I/O and CPU units must both be reset.

In the particular embodiment, since the reference data are composed of 8 bits, the probability that the data equal to the reference data will be written into register 60 when the program runs abnormally is reduced by a factor of $\frac{1}{2}^7 = 1/128$ in accordance with the difference in the number of bits (8 bits in the particular embodiment; 1 bit in the prior art example, and therefore the difference is 7 bits). If the bit capacity of the register is 16, $\frac{1}{2}^{15} = 1/32768$, and therefore the reliability of detection of an abnormal state of the computer operation is greatly enhanced, whereby a highly reliable watchdog timer is realized.

Figure 2:
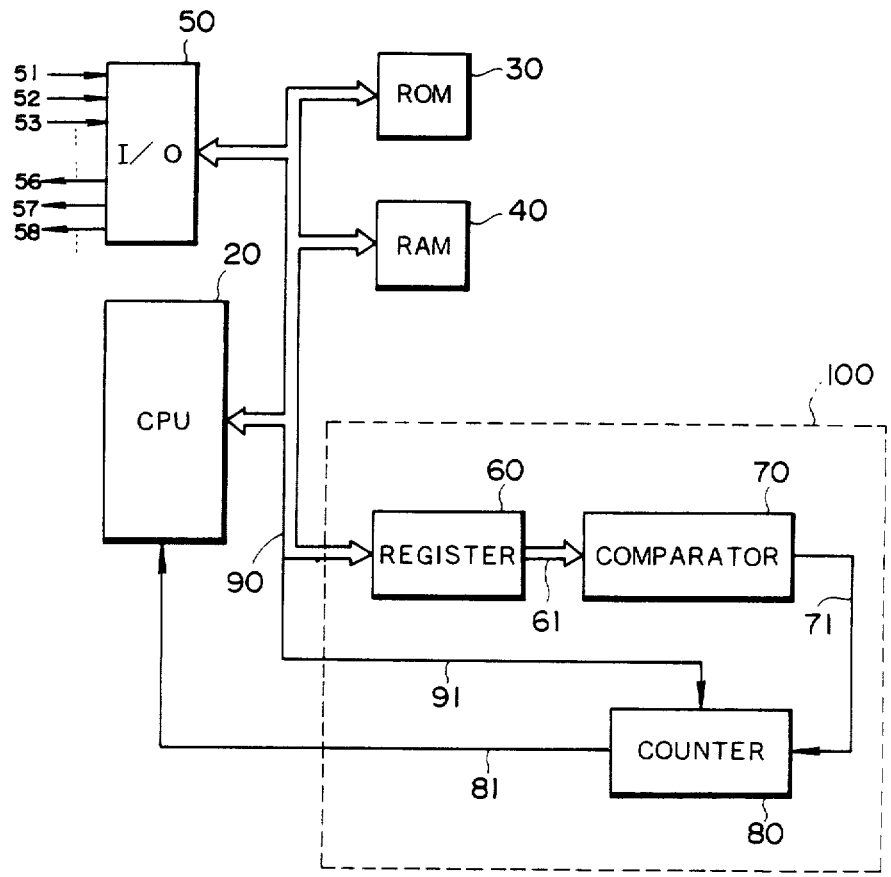
FIG. 2 is a block diagram of a watchdog timer according to the present invention, associated with a microcomputer.
Figure 3:
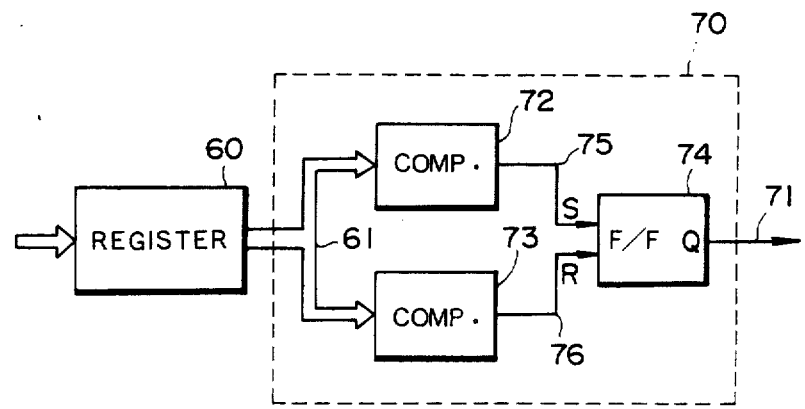
FIG. 3 is an alternative to the comparator used in FIG. 2.

FIG. 3 shows another embodiment of comparator 70 and elements thereof having the same functions as in FIG. 2 are given the same reference numerals. Comparator 70 includes a comparator 72 and a second comparator 73 and a R/S flip-flop 74, and the comparators have different reference data (in this particular embodiment, for example, hexadecimal AA (10101010) and 55(01010101), respectively). CPU 20 writes the data equal to the reference data AA and 55 alternately into register 60 via bus 90 with a period of time T. Thus the outputs 75 and 76 of the comparators change to 1 and 0 alternately, i.e., when comparator output 75 is 1, comparator output 76 is 0 and vice versa. Thus, pulses are input to the set and reset inputs of flip-flop 74 at intervals of time 2T, so that the comparator output 71 is a pulse signal having a period of time 2T similar to the signal in the embodiment of FIG. 2, which clears counter 80 If execution of the program goes awry, so that no data equal to the reference data is inputted any longer into either or both of the comparators, the flip-flop remains set or reset, thereby producing an unchanging output. Thus, a reset signal is produced as in the case of FIG. 2. In this particular embodiment, coincidence with both the two reference data is required, so that the reliability of detecting abnormality is further enhanced.

The reference data should desirably differ from the commands and data stored in ROM 30. If a value completely distinct from other ROM data and commands is used, certain detection of abnormality will be attained. Use of values not used in the program improves reliability of detection.

Since programmers determine the data values to be used in accordance with the control requirements after manufacture of the computer IC's, it is often difficult to select data values not coincident with program data. However, since computer command bytes are normally well known before custom IC manufacture, it will generally be possible to select monitor data values which do not coincide with command values, and this alone will improve monitor reliability.

If the two reference data have opposite individual digits, i.e., if they are complements, as is the case with AA and 55 in this particular embodiment, there is a minimum possibility of inability to detect abnormality. Provision of two separate register addresses, one for each comparator, to which data may be separately written will further improve reliability.

Figure 4:
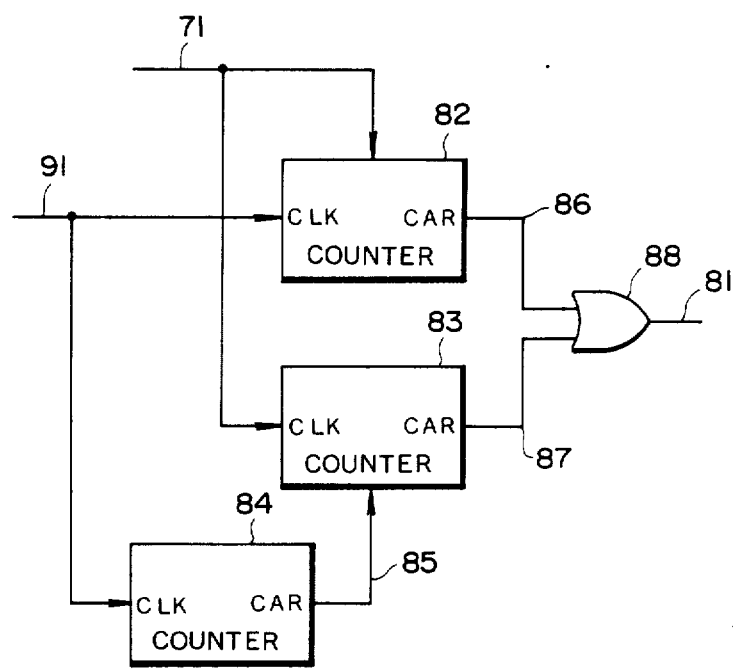
FIG. 4 is an alternative to the counter used in FIG. 2.

FIG. 4 shows another embodiment of counter 80. Counters 82, 83 and 84, respectively, each have a clock input terminal CLK, a clear input terminal CLR and a carry output terminal CAR. Counter 82, having the same structure as the counter of FIG. 2, produces a carry 86 which will be a reset signal 81 passing through OR gate 88 unless a clear signal 71 is inputted thereto within time T' after the previous clear signal 71. Counter 84 counts clock pulses 91 and provides a clear signal 85 to counter 83 after every period of time T'''. Counter 83 is composed of m-staged flip-flops and counts clear signals 71 as a clock input. Since clear signal 71 has a period 2T, counter 83 produces a carry 87 every period of time $T'''' = 2T \times 2^m$ unless cleared by the output 85 of counter 84.

Now assume that T'' is only slightly less than T''''. Normally, counter 83 does not produce a carry 87 because it is cleared by the signal from counter 84 after every time T'''. When the program runs abnormally such that T'''' becomes less than T'' because the period 2T of signal 71 has decreased, a carry 87 appears as a reset signal 81 via OR gate 88. Alternatively, in case of program malfunction, the period 2T might increase, in which case counter 82 will function to reset the CPU 20 as in the first embodiment. In other words, regardless of whether the value of T becomes greater or less due to some abnormalities, it is determined that abnormality has occurred, thereby resetting CPU 20. Naturally, the specific counting system of FIG. 4 may be combined to either of the comparators of FIG. 2 and 3 to obtain higher reliability or may be used with 1-bit data as in the prior art to enhance the reliability thereof. Although the present invention has been described with respect to the embodiments which produce a reset signal when abnormality occurs, it may also produce an alarm along with a reset signal, e.g., by producing an interrupt signal to be supplied to the CPU to perform a priority interrupt, thereby returning the CPU to its predetermined state or stopping the CPU.

As described above, according to this invention, the program is determined to be running abnormally unless the CPU writes a predetermined data comprising a plurality of bits into the watchdog register. Thus, there is a greatly reduced probability compared to the prior art watchdog timer that abnormality will be mistaken for normality, thereby realizing a microcomputer system with high reliability. Thus, the watchdog timer according to this invention allows the microcomputer system to be satisfactorily used in environments susceptible to strong static electrical charges or electromagnetic noise. Furthermore, since the embodiments described above are all of digital circuits which have simple structures, they can be easily incorporated into a so-called "single-chip computer", so that they are not easily influenced by the effects of external noise on interconnecting leads. In that case, if a so-called "open collector" output terminal is provided on the single-chip computer to allow the reset signal to be inputted from the outside, it is advantageous to apply a power-on-reset signal from the outside as well as to use an internal signal to reset the external circuitry.

While the invention has been described and shown in terms of several embodiments thereof, various changes and modifications could be made by those skilled in the art without departing from the scope of the attached claims. Thus it should be noted that the present invention should not be limited to the embodiments thereof, but by the attached claims.

What is claimed is:

1. A watchdog timer for a computer, said computer alternately producing first and second periodic signals representative of first and second data which are different from one another, each of said first and second data consisting of a plurality of bits, said watchdog timer comprising:
   (a) a register receiving and storing said first and second data;
   (b) means for comparing said first data stored in said register with a first reference data and for comparing said second data stored in said register with different second reference data and producing an output signal only when the pairs of compared data coincide;
   (c) means for generating clock pulses; and
   (d) means for counting the clock pulses from said clock generating means and for producing a reset signal to said computer when the count of said counting means reaches a predetermined value, said counting means being reset by the output signal of said comparing means, and the time interval required for said counting means to count to the predetermined value being longer than the interval of occurrence of said output signal of said comparing means while said computer operates in a normal state.

2. A watchdog timer as claimed in claim 1, wherein said comparing means comprises a first comparator comparing said first stored data with said first reference data, said first stored data being equal to said first reference data only when the computer operates in said normal state, said first comparator producing a first comparator signal when the two compared data coincide, a second comparator for comparing said second data stored in said register with said second reference data, said second stored data being equal to said second reference data only when the computer operates in said normal state, said second comparator producing a second comparator signal when the two compared data coincide, and a flip-flop having set and reset input terminals and an output terminal and connected to said first and second comparators and said counting means such that the output of said first comparator is outputted to one of said set and reset terminals of said flip-flop, the output of said second comparator is outputted to the other of said set and reset terminals of said flip-flop and the output of said flip-flop is outputted to said counting means for resetting said counting means when changing from one of the set and reset states to the other.

3. A watchdog timer as claimed in claim 1, wherein said counting means includes a first counter for counting said clock pulses to a first predetermined value and outputting a carry signal, said first counter being reset by the output signal from said comparing means, the time interval required for said first counter to count to the first predetermined value being greater than twice the period of alternation of said first and second signals; a second counter for counting said clock pulses to a second predetermined value and outputting a carry signal; and a third counter for counting the outputs of said comparing means to a third predetermined value and outputting a carry signal, said third counter being reset by the carry signal from said second counter, the capacity of said second and third counters being selected such that when the computer is operating in its normal state, the time required for said third counter to count to the third predetermined value is greater than the corresponding time for the second counter to count to the second predetermined value, the carry signals from each of said first and third counters being used to reset said computer.

4. A watchdog timer as claimed in claim 2, wherein said counting means includes a first counter for counting said clock pulses to a first predetermined value and outputting a carry signal, said first counter being reset by the output signal from said comparing means, the time interval required for said first counter to count to the first predetermined value being greater than twice the period of alternation of said first and second signals; a second counter for counting said clock pulses to a second predetermined value and outputting a carry signal; and a third counter for counting the outputs of said comparing means to a third predetermined value and outputting a carry signal, said third counter being reset by the carry signal from said second counter, the capacity of said second and third counters being selected such that when the computer is operating in its normal state, the time required for said third counter to count to the third predetermined value is greater than the corresponding time for the second counter to count to the second predetermined value, the carry signals from each of said first and third counters being used to reset said computer.

5. A method of detecting a malfunction of a computer and resetting the computer to its initial state, comprising the steps of:
   (a) causing said computer to alternatingly produce a first and second signal representative of first and second data respectively, each data including a plurality of bits;
   (b) comparing the first and second computer produced data to a first and second different reference data and producing a second signal when the first computer produced data equals the first reference data and the second computer produced data equals the second reference data;
   (c) producing clock pulses;
   (d) causing a counter with a predetermined capacity to count the clock pulses and to produce a third signal to reset said computer when said counter counts to its predetermined capacity; and
   (e) resetting the counter with said second signal.

6. A method as claimed in claim 5, wherein said first and second reference data are complements.

7. The method of claim 5, further comprising the steps of counting the clock pulses and producing a carry signal when a first predetermined number of clock pulses has been counted, counting occurrences of the second signal and resetting the computer when a second predetermined number of second signal occurrences has been counted, the ratio of the first and second predetermined numbers being less than the ratio of the periods of the second signal and the clock pulses under a normal operating mode of said computer, and resetting the count of occurrences of the second signal in response to the carry signal.

8. A watchdog timer for a computer which alternately produces first and second periodic signals representative of first and second data different from one another, each of said first and second data consisting of a plurality of bits, said watchdog timer comprising:

(a) a register receiving and storing said first and second data;

(b) means for periodically and alternately comparing said first data stored in said register with a reference data and for comparing said second data stored in said register with said reference data, said comparing means producing a first output signal when either one of said pairs of compared data coincide, and a second output signal when either one of said pairs of compared data do not coincide;

(c) means for generating clock pulses; and (d) means for counting the clock pulses from said clock generating means and for producing a reset signal to said computer when the count of said counting means reaches a predetermined value, said counting means receiving said first and second output signals from said comparing means and being reset thereby, and the time interval required for said counting means to count to the predetermined value being longer than the interval of occurrence of said first and second output signals of said comparing means while said computer operates in a normal state.

* * * * *